United States Patent
Brinnand et al.

(10) Patent No.: US 6,542,932 B1
(45) Date of Patent: Apr. 1, 2003

(54) DOMAIN ACCESS CONTROL FOR LOGGING SYSTEMS

(75) Inventors: John P. Brinnand, Sunnyvale, CA (US); Rajeev Angal, Santa Clara, CA (US); Balaji V. Pagadala, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/332,270

(22) Filed: Jun. 11, 1999

(51) Int. Cl.[7] .............................................. G06F 15/16
(52) U.S. Cl. ...................... 709/229; 709/223; 709/225; 709/226; 707/10
(58) Field of Search .............................. 707/9, 10, 2, 6, 707/101, 217; 709/201, 229, 223, 225, 228, 226

(56) References Cited

U.S. PATENT DOCUMENTS

| | | | | |
|---|---|---|---|---|
| 4,760,572 A | * | 7/1988 | Tomikawa | 370/94 |
| 5,446,878 A | * | 8/1995 | Royal | 395/180 |
| 5,903,898 A | * | 5/1999 | Cohen et al. | 707/204 |
| 6,199,106 B1 | * | 3/2001 | Shaw et al. | 709/203 |
| 6,292,827 B1 | * | 9/2001 | Raz | 709/217 |

* cited by examiner

Primary Examiner—Thomas Lee
Assistant Examiner—Jinsong Hu
(74) Attorney, Agent, or Firm—Meyertons, Hood, Kivlin, Kowert, & Goetzel, P.C.; B. Noël Kivlin

(57) ABSTRACT

A method of and system for control of access to add an event notification as a log record in a computer system. Each potential log record is associated with one or more logs, each of which has one or more log owners. Grant of access to add a log record to the information in a particular log is restricted to the owner(s) of that log. A list of owners of a log can be changed from time to time, based upon present circumstances or the presence of special conditions.

20 Claims, 4 Drawing Sheets

DOMAIN ACCESS CONTROL FOR LOGGING SYSTEMS

CROSS REFERENCE TO RELATED PATENT APPLICATIONS

This patent application is related to other patent applications, filed herewith on the same day and entitled "Apparatus, Methods And Computer Program Products For Network Management Operations Relating To Network Management Protocol Adapter Security Software (MPASS) For Single And Multiple Users", Ser. No. , "Secure User Association And Set-Up Using Network Management Protocol Adapter Security Software (MPASS)", Ser. No. 09/330,902, "Messaging With User Name Access Identification Using Network Management Protocol Adapter Security Software (MPASS)", Ser. No. 09/330,902, "Independent Log Containment Hierarchy", Ser. No. 09/330,514, and "Distinguished Name Scoping System For Event Filtering", Ser. No. 09/330,790. These related patent applications are hereby expressly reference and incorporated herein in their entirety.

COPYRIGHTS IN PATENT MATERIAL

Portions of this patent document contain material subject to copyright restriction. The copyright owner has no objection to facsimile reproduction of the patent document after grant, as it appears in the U.S. Patent and Trademark Office files or records, but otherwise reserves all rights relating thereto.

TECHNICAL FIELD

This invention relates to apparatus, methods and computer program products used in recording status in and granting access to a computer logging system.

BACKGROUND OF THE INVENTION

At present, a computer network user has access to certain objects in a management information tree (MIT). Availability of these objects to a given user can be controlled through access control. However, notification of all object and object changes from the management information system (MIS) are recorded into any available log in the system. Thus, even a user that has access to only a limited number of objects in the MIT is made aware of the state of other objects to which the user has no access. Any given log will unrestrictedly record events from objects in the MIT, once an object appears in the MIS. In some situations, this approach is undesirable, or even unacceptable.

A network manager may need flexibility in configuring the system to restrict the access to, or knowledge of, a given object, for a user or a class of users. The manager may also need the flexibility to change the restrictions on access and knowledge applied to a given user from time to time, based on "need to know", changing project requirements, and the assumption or relinquishment of new or old responsibilities.

SUMMARY OF THE INVENTION

These needs are met by the invention, which associates with each log a list of one or more "owners", users who have access to that log. When an event notification is received, a set of access control rules determines whether a given user has access to the portion of the log where that event information would be placed. This information is recorded in the user's log if and only if the user's name is on a list associated with that information. Access control rules are extended to a log, based on the nature of the information recorded in that log. Restriction of user access to a log, as opposed to grant of unlimited access to the log, is controlled by one or more parameters entered at a secure central station.

DESCRIPTION OF PREFERRED MODE OF THE INVENTION

Figure 1:
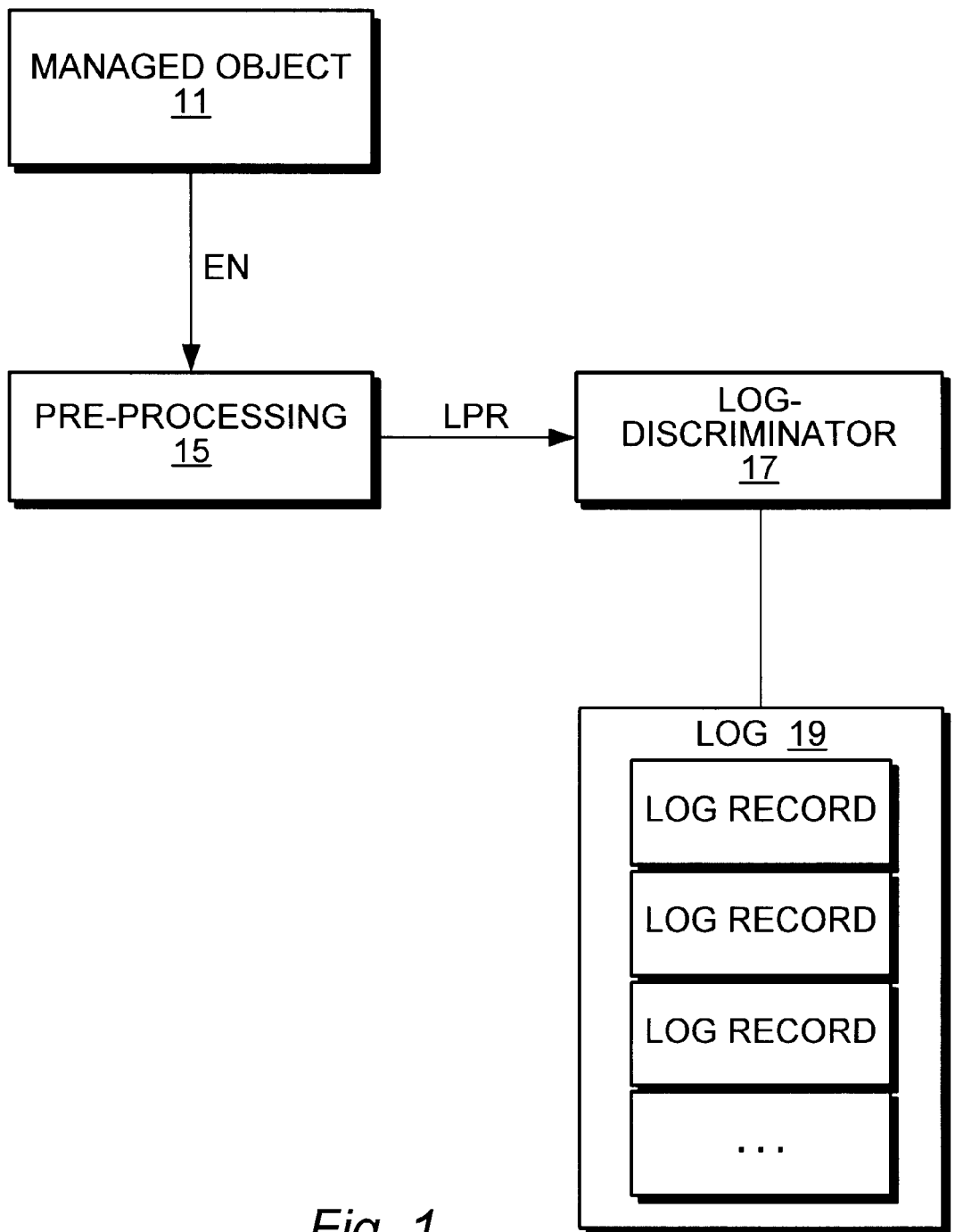
FIG. 1 illustrates a record logging environment.

FIG. 1 illustrates an environment in which event logging is implemented. Each log includes a set of log records, one for each event logged, arranged substantially chronologically in the order that the event information was received and processed, and with a unique numerical identifier being sequentially assigned to each log record. Event information to be logged is obtained from event reports provided by an event reporting function, from incoming protocol data units (PDUs) from common management information protocols (CMIPs), and from internal events. A managed object 11 causes an event notification (EN) to issue, and the notification is received and examined by a pre-processing module 15 that extracts the relevant information. This relevant event information is presented as a potential log report (PLR) to a log-discriminator module 17 that (1) examines each log report to determine if any of the event information in the potential log report matches information of concern to the associated log 19 and (2) accepts and stores the potential log report in the log 19 if and only if a match occurs. A log record is created from receipt of an event notification, or as a side effect of a management operation.

Figure 2:
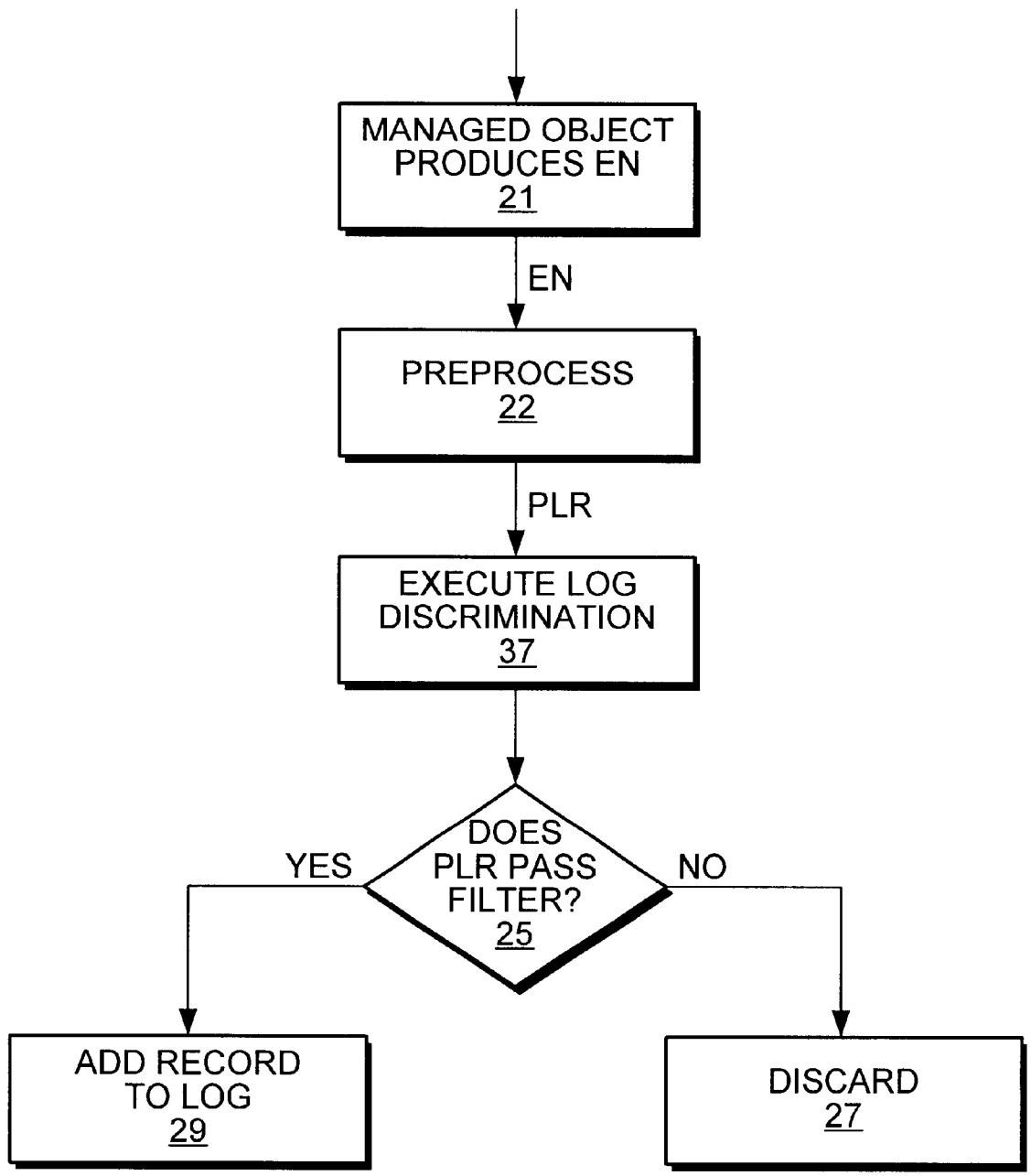
FIG. 2 is a flow chart of a procedure for conventional logging of a record of an event..

FIG. 2 is a flow chart illustrating logging of a record in the prior art. A managed object produces an event notification in step 21. The EN is preprocessed in step 22 and relevant information is identified and incorporated in a potential log report (PLR). The PLR is presented to a log-discriminator module (which may be part of the pre-processing module), which applies its procedure(s) to the PLR in step 23. In step 25, the system determines if the PLR passes the filter(s) associated with the log discriminator. If the answer to the question in step 25 is "no", the system discards the record, in step 27. If the answer to the question in step 25 is "yes", the system adds the record associated with the PLR to the log, in step 29.

Each log is a managed object having a number of log-object class attributes: log ID (unique identifier); state (administrative, operational and usage) of the log; scheduling information for the active periods, when the log will accept new records; present availability of the log; discriminator construct (description of types of event information to be logged); maximum log size (in bytes or octets); current log size; number of records presently in the log; log-full action (reaction when the log is filled; the options are wrap of FIFO or halt, with no more records being accepted); capacity alarm threshold, indicating that the log has reached a selected fraction of its capacity); and notifications that are generated when the log is created, modified, suspended, resumed and/or deleted, or when a log record has been retrieved or deleted. The attributes of primary interest are the scheduling information and the discriminator construct.

The log-object class includes a mandatory package, the log-Package, which includes the logID, discriminator construct, administrative state (locked versus unlocked), operational state (enabled versus disabled), availability (including a log-full condition, if this is present), and log-full action. Several conditional packages, related to maximum log size, are available to allow some flexibility in logging: finiteLogSize (present if the log size is bounded), maxLogSize, numberOfRecords, logAlarmiPackage. Other conditional packages may be included to allow some flexibility in scheduling. Logging activity is discussed in greater detail by William Stallings in *SNMP, SNMPv2* and *CMIP*, Addison-Wesley Publ. Co., 1993, Reading Mass., pp. 498–504.

The invention introduces and uses the concept of an owner (individual user or group of users) of a log, or of a specified portion of a log. The log owner has one group of objects in the MIT to which the owner has access; the owner may have conditional access to a second group of objects and may have no access to a third group of objects in the MIT. An auxiliary object is created, containing a log identifier and the owner ID for that log. The default owner of a log is the root level, which may be interpreted to allow access to all users. A user can edit that user's auxiliary object and can change the owner, or add to or delete from the list of owners, of the associated log. A log owner can be added to access control and can be given certain managed objects to which the owner now has access. This action creates an association between the log and the managed objects, with a common link being the user or user name.

After this association is created, the log server now performs access control on event notifications. When an event notification is received by the log server, the server checks the user/log owner's ID and determines whether the log owner has access to the managed object that is the source of the notification. If the user has access to that managed object, the event notification will be logged in the user's log; if the user has no access, the event notification will not be logged in the user's log.

A single log may be divided into subsets, each with an associated log owner or owners, and access to each log can be limited to users set forth in access control rules. Information in a log is unavailable to a user if that user is not listed as a log owner.

Under normal operating conditions in the prior art, a log server does not perform event access control to allow or withhold allowance of logging of a record. This function is available, if desired, in the invention, using a new configuration that is activated by specification of one or more parameters in an enterprise manager (EM) file. In one embodiment, a single parameter, called EM_LOG_MPA_EVENT_ACCESS is used and is preferably entered at a central station to which access is limited. When this parameter is set to "false", a log associated with a PLR can be entered as a log record. When this parameter is set to "true", access by a given user is limited to a log associated with that user. One or more additional parameters is preferably used to specify or define a log to which a user has access for logging purposes. A user may become listed or de-listed for access to a particular log from time to time, depending upon the present circumstances, by change of one or more of the parameters.

In the first embodiment, a given user is granted access or denied access to a particular log, based solely on log ownership; access is strictly yes/no. In a second embodiment, a given user can be granted conditional access to a log, when certain conditions are present, and is denied access to that log when the specified conditions are not present. In this second embodiment, the conditions for access are specified by one or more additional parameters entered at the central station. For example, a user may be granted access to allow logging of a record that is not normally associated with that user if the log owner normally associated with that record is presently inoperative.

Figure 3:
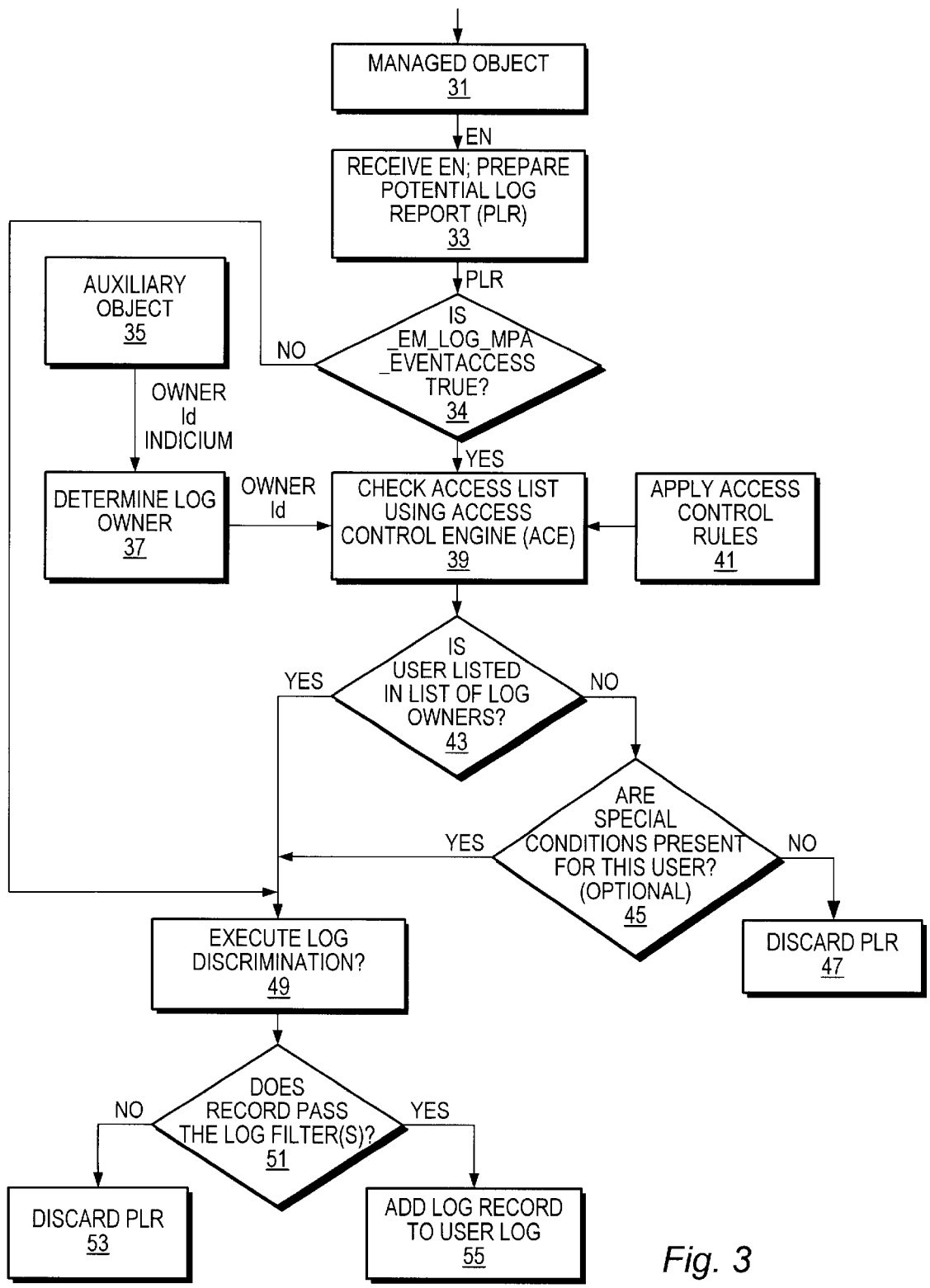
FIG. 3 is a flow chart of a procedure for practicing the invention

FIG. 3 is a flow chart illustrating a procedure for practicing the invention. In step 31, a managed object provides an event notification, which is received and pre-processed to provide a potential log report or record (PLR) for a selected log in step 33. In step 34, the system determines if the parameter EM_LOG_MPA_EVENTACCESS is true? If the answer to the question in step 34 is "yes", the next step is 39. If the answer to the question in step 34 is "no", the next step is 49.

Simultaneously, an auxiliary object provides an owner Id indicium, in step 35, for the managed object of step 31. In step 37, the owner Id indicium is used to determine the log owner. The system receives the PLR after step 33, and receives the owner Id from step 37. In step 39, the system checks a log access list, using an access control engine (ACE) that is controlled by one or more access control rules applied in step 41.

In step 43, the system determines if the identified user, for whom the PLR is presented, is listed in the list of log owners associated with the selected log. If the answer to the question in step 43 is "no", in a first embodiment the system ignores step 45 and discards the PLR presented, in step 47. If the answer to the question in step 43 is "yes", the system executes a log discrimination procedure, in step 49.

The system determines if the presented log record passes the condition(s) required by the log filter(s), in step 51. If the answer to the question in step 51 is "no", the system discards the record, in step 53. If the answer to the question in step 51 is "yes", the system adds the log record to the log, in step 55. In a first alternative approach, steps 49, 51, 53 and 55 can be placed ahead of the step 43, 45 and 47 in the procedure. In this alternative approach, log filtering based on subject is performed ahead of log filtering based on log owner(s). In a second alternative approach, steps 49, 51 and 53 may be deleted so that the system grants or withholds access to a log, to add a log record thereto, based solely on who is, or is not, listed as a log owner for that log.

In a second embodiment, if the answer to the question in step 43 is "no", the system determines if special conditions are present that allow this user access to add a record, in step 45. If the answer to the question in step 45 is "no", the system discards the PLR presented, in step 47. If the answer to the question in step 45 is "yes", the system proceeds to step 49 and continues as in the first embodiment.

The invention provides a mechanism for control of access to a log based on (1) log ownership by a user that presents a log record or (2) log ownership combined with conventional filtering of a log record according to subject or topic of the presented log record. The invention thus provides a means of restricting user access to a log, for purposes of adding a selected PLR to a log, based on whatever access control rules are adopted for that user or class of users. Restriction of user access may be based on "need to know" or any other reasonable criteria or may be based, in part, on which user first presents a selected PLR to a log. The invention could be used, for example, to prevent multiple logging of a single EN that is sensed at different user sites at different times following the event that gives rise to the EN.

Figure 4:
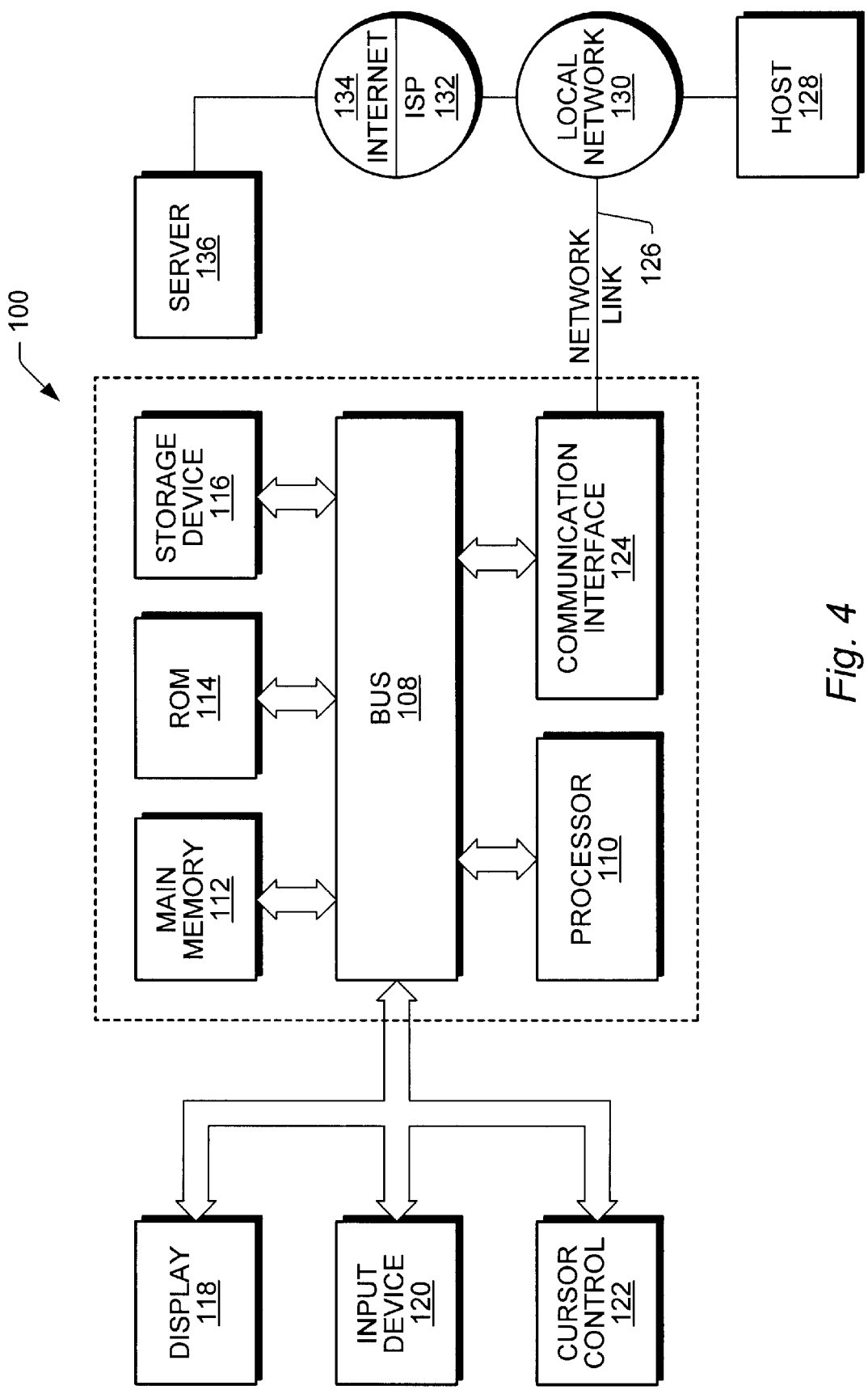
FIG. 4 is a schematic view of a computer system..

FIG. 4 shows a block diagram of a general computer system 100, which may be used to implement various hardware components of the invention, such as a client, an applications server and a database management system. The computer system 100 includes a bus 108 or other communication mechanism for communicating information and a processor 110, coupled with the bus 108, for processing information. The computer system 100 also includes a main memory 112, such as a random access memory (RAM) or other dynamic storage device, coupled to the bus 108, for storing information and instructions to be executed by the processor 110. The main memory 112 also may be used for storing temporary variables or other intermediate information during execution of instructions by the processor 110. The computer system 100 further optionally includes read only memory (ROM) 114 or other static storage device, coupled to the bus 108, for storing static information and instructions for the processor 110. A storage device 116, such as a magnetic disk or optical disk, is provided and is coupled to the bus 108 for storing information and instructions.

The computer system 100 may also be coupled through the bus to a display 118, such as a cathode ray tube (CRT), for displaying information to a computer user. An input device 120, including alphanumeric and other keys, is coupled to the bus for communicating information and commands to the processor 110. Another type of user input device is a cursor control 122, such as a mouse, a trackball or cursor direction keys for communicating direction information and command selections to the processor 110 and for controlling cursor movement on the display 118. This input device typically has one degree of freedom in each of two axes, such as x- and y-axes, that allows the device to specify locations in a plane.

The functionality of the invention is provided by the computer system 100 in response to the processor 110 executing one or more sequences of instructions contained in main memory 112. These instructions may be read into main memory 112 from another computer-readable medium, such as a storage device 116. Execution of the sequences of instructions contained in the main memory 112 causes the processor 110 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 110 for execution. This medium may take many forms, including but not limited to non-volatile media, volatile media and transmission media. Non-volatile media includes, for example, optical and magnetic disks, such as the storage disks 116. Volatile media includes dynamic memory 112. Transmission media includes coaxial cables, copper wire and fiber optics and includes the wires that are part of the bus 108. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

various forms of computer-readable media may be involved in carrying out one or more sequences of one or more instructions to the processor 110 for execution. For example, the instructions may initially be carried on a magnetic disk of a remote computer. The remote computer can load the instructions into its dynamic memory and send the instructions over a telephone, using a modem. A modem local to the computer system 100 can receive data over a telephone line and use infrared transmitter to convert and transmit the data to the an infrared detector connected to the computer system bus. The bus will carry the data to the main memory 112, from which the processor receives and executes the instructions. Optionally, the instructions receive by the main memory 112 can be stored on the storage device 116, either before or after execution by the processor 110.

The computer system 100 also includes a communications interface 124, coupled to the bus 108, which provides two-way data communication coupling to a network link 126 that is connected to a local area network (LAN) or to a wide area network (WAN). For example, the communications interface 124 may be an integrated services digital network (ISDN) card or a modem to provide a data communication connection to a corresponding type of telephone line. As another example, the communications interface 124 may be a local area network card to provide a data communication connection to a compatible LAN. Wireless links may also be implemented. In any such implementation, the communications interface 124 sends and receives electrical, electromagnetic or optical signals that carry digital data streams representing various types of information.

The network link 126 typically provides data communication through one or more networks to other data devices. For example, the data link 126 may provide a connection through an LAN 128 to a host computer 130 or to data equipment operated by an Internet Service Provider (ISP) 132. The ISP, in turn, provides data communication services through the world wide packet data communication network, now commonly known as the "Internet" 134, served by one or more servers 136. The LAN 128 and the Internet 134 both use electrical, electromagnetic and/or optical signals to carry the digital data streams. The signals carried by these network, the signals carried on the network link 126 and the signals carried on the communications interface 124, are examples of carrier waves that transport the information.

What is claimed is:

1. A computer implemented method of managing logging operations on a network management platform in a computer network, the method comprising:

storing management data corresponding to a log for an object on a network user station of the computer network, wherein said management data includes an owner list for said log;

receiving an event notification of a present state of said object involving a user of said network user station;

generating a potential log report including data corresponding to said object and to said user from said event notification;

comparing said potential log report with said management data; and when said user data is not included in said owner list, declining to record said potential log record as a part of said log for said object.

2. The method of claim 1, further comprising:

when said user data is not included in said owner list, adding said user data to said owner list at a selected time; and recording said potential log report as part of said log after said selected time.

3. The method of claim 1, further comprising:
when said user data is included in said owner list, recording said potential log report as part of said log.

4. The method of claim 3, further comprising:
when said user data is included in said owner list, deleting said user data from said owner list at a selected time; and
declining to record said potential log record after the selected time as part of said log.

5. The method of claim 1, further comprising:
comparing a second user data of the potential log report, indicating at least one class of events, with said corresponding management data; and
when said corresponding management data is not included in the second user data, declining to record said potential log report as part of said log.

6. The method of claim 1, further comprising:
when said user data is not included in said potential log report, determining if at least one selected condition is present;
when the selected condition is present, adding said user data to said potential log report for a selected time interval that includes at least one time during which the selected condition is present; and
recording said potential log report as part of said log.

7. A computer implemented system managing logging operations on a network management platform in a computer network, the system comprising a computer that is programmed:
to store management data corresponding to a log for an object on a network user station of the computer network, wherein said management data includes an owner list for said log;
to receive an event notification of a present state of said object involving a user of said network user station;
to generate a potential log report including data corresponding to said object and to said user from said event notification;
to compare said potential log report with said management data; and
when said user data is not included in said owner list, to decline to record said potential log record as a part of said log for said object.

8. The system of claim 7, wherein said computer is further programmed so that:
when said user data is not included in said owner list, said user data is added to said owner list at a selected time; and
said potential log report is recorded as part of said log after said selected time.

9. The system of claim 7, wherein said computer is further programmed so that:
when said user data is included in said owner list, said is recorded as a potential log report as part of said log.

10. The system of claim 9, wherein said computer is further programmed so that:
when said user data is included in said owner list, said user data is deleted from said owner list at a selected time; and
said system declines to record said potential log record after the selected time as part of said log.

11. The system of claim 7, wherein said computer is further programmed:
to compare a second user data of the potential log report indicating at least one class of events, with said corresponding management data; and
when said corresponding management data is not included in the second user data to decline to record said potential log report as part of said log.

12. The system of claim 7, wherein said computer is further programmed:
when said user data is not included in said potential log report, to determine if at least one selected condition is present;
when the selected condition is present, to add said user data to said potential log report for a selected time interval that includes at least one time during which the selected condition is present; and
to record said potential log report as part of said log.

13. A computer program product embodied in a computer usable medium, the computer program product comprising a computer readable code mechanism configured:
to store management data corresponding to a log for an object on a network user station of the computer network, wherein said management data includes an owner list for said log;
to receive an event notification of a present state of said object involving a user of said network user station;
to generate a potential log report including data corresponding to said object and to said user from said event notification;
to compare said potential log report with said management data; and
so that, when said user data is not included in said owner list, the product declines to record said potential log record as a part of said log for said object.

14. The computer program product of claim 13, wherein said code mechanism is configured so that:
when said user data is not included in said owner list, said user data is added to said owner list at a selected time; and
said potential log report is recorded as a part of said log after said selected time.

15. The computer program product of claim 13, wherein said code mechanism is configured so that:
when said user data is included in said owner list, said is recorded as a potential log report as part of said log.

16. The computer program product of claim 13, wherein said code mechanism is configured so that:
when said user data is included in said owner list, said user data is deleted from said owner list at a selected time; and
said code mechanism declines to record said potential log record after said selected time as part of said log.

17. The computer program product of claim 13, wherein said code mechanism is configured so that:
to compare a second user data of the potential log report indicating at least one class of events, with said corresponding management data; and
when said corresponding management data is not included in the second user data, said code mechanism declines to record said potential log report as part of said log.

18. The computer program product of claim 13, wherein said code mechanism is configured so that:
when said user data is not included in said potential log report, said code mechanism determines if at least one selected condition is present;

when the selected condition is present, said code mechanism adds said user data to said potential log report for a selected time interval that includes at least one time during which the selected condition is present; and said code mechanism records said potential log report as part of said log.

19. The method as recited in claim 1, wherein a central computer station of the computer network is configured to receive the event notification and one or more event notifications from the network user station and one or more other network user stations of the computer network.

20. The method as recited in claim 1, further comprising:
determining that said management data includes data corresponding to said object.

* * * * *